(12) United States Patent
Kelm et al.

(10) Patent No.: US 7,566,401 B2
(45) Date of Patent: Jul. 28, 2009

(54) PROCESS FOR SEPARATING AND ISOLATING XANTHINES, INDIVIDUAL POLAR PROTIC MONOMERS, AND POLAR PROTIC OLIGOMERS

(76) Inventors: Mark A. Kelm, 203 Dry Pond Rd., East Stroudsburg, PA (US) 18301; Christopher J. Johnson, 539 American Dr., Yardley, PA (US) 19067; Rebecca J. Robbins, 72 The Village Green, Apt. M, Budd Lake, NJ (US) 07828

( * ) Notice: Subject to any disclaimer, the term of this patent is extended or adjusted under 35 U.S.C. 154(b) by 771 days.

(21) Appl. No.: 11/242,210

(22) Filed: Oct. 3, 2005

(65) Prior Publication Data

US 2007/0075020 A1 Apr. 5, 2007

(51) Int. Cl.
*B01D 15/08* (2006.01)
(52) U.S. Cl. .................. 210/635; 210/656; 210/198.2; 424/725; 424/776
(58) Field of Classification Search ................ 424/725, 424/776; 210/635, 656, 659, 198.2
See application file for complete search history.

(56) References Cited

U.S. PATENT DOCUMENTS

| 5,670,673 | A | 9/1997 | Rao et al. |
| 6,210,679 | B1 | 4/2001 | Bailey et al. |
| 6,627,232 | B1 | 9/2003 | Hammerstone et al. |
| 2005/0065341 | A1 | 3/2005 | Wang et al. |
| 2005/0136521 | A1 | 6/2005 | Shukla et al. |
| 2005/0152839 | A1 | 7/2005 | Lila et al. |
| 2005/0153879 | A1 | 7/2005 | Svetina |

OTHER PUBLICATIONS

Yanagida (Journal of Chromatography A, 890 (2000) 251-259).*

J.F. Hammerstone, et al., "Procyanidin Content & Variation in Some Commonly . . . " Symposium "Chocolate Modern Science Investigates an Ancient Medicine" Washington DC 2086S-2092S.

M.A. Kelm, et al., "High-Performance Liquid Chromatography Separation and Purifcation of Cacao (Theobroma Cacao L.) . . . " J. Agric. Food Chem. 54:1571-1576 (2006).

Lazarus et al., "Chocolate Contains additional flavanoids not found in tea" The Lancet 354 No. 9192:5 (Nov. 20, 1999).

(Continued)

*Primary Examiner*—Ernest G Therkorn (57) ABSTRACT

An improved process for separating and isolating individual polar protic monomer(s) and/or oligomer(s) on the basis of degree of polymerization. A liquid sample containing polar protic monomer(s) and/or oligomer(s) is introduced into a liquid chromatography (LC) column packed with a polar bonded stationary chromatographic phase. The individual polar protic monomer(s) and/or oligomer(s) are separated via a binary mobile phase elution. One or more individual fractions containing the monomer(s) and/or oligomer(s) are eluted. The polar protic monomer(s) and/or oligomer(s) may be proanthocyanidins, hydrolyzable tannins, oligosaccharides, oligonucleotides, peptides, acrylamides, polysorbates, polyketides, poloxamers, polyethylene glycols, polyoxyethylene alcohols or polyvinyl alcohols. The binary mobile phase comprises an A phase consisting essentially of a polar aprotic solvent and a B phase consisting essentially of a polar protic solvent.

A process for separating and isolating xanthine(s) (e.g., caffeine and theobromine) from polar protic monomer(s) and/or oligomer(s). A liquid sample containing xanthine(s) and polar protic monomer(s) and/or oligomer(s) is introduced into an LC column packed with a polar bonded stationary chromatographic phase. The xanthines are separated via an isocratic mobile phase elution, and one or more individual fractions containing the xanthines are eluted.

19 Claims, 11 Drawing Sheets

OTHER PUBLICATIONS

Adamson et al., "HPLC Method for the Quantification of Procyanindins in Cocoa and Chocolate Samples and Correlation to Total Antioxidant Capacity" pp. A-E (Jul. 6, 1999).

K.A. Cooper, et al., "Rapid Reversed Phase Ultra-Performance Liquid Chromatography Analysis of the Major Cocoa Polyphenols . . ." J. Agric. Food Chem. pp. A-G Mar. 16, 2007.

L. Gu et al., "Procyanidin and Catechin Contents and Antioxidant Capacity of Chocolate and Cocoa Products", J. Agric. Food Chem. pp. A-E May 4, 2006.

J. F. Hammerstone, et al., "Procyanidin Content and Variation in SOme Commonly Consumed Foods", Am. Soc. for Nutr. Sci., pp. 2086S-2092S (2000).

M. Kelm, et al., "High-Performance Liquid Chromatography Separation and Purification of Cacao Theobroma Cacao L. Procyanidins . . . ", J. Agric. Food Chem. 54:1571-1576 (2006).

S.A. Lazarus, et al., "High Performance Liquid Chromatography/ Mass Spectrometry Analysis of Proanthocyanidins in Foods and Beverages", pp. A-I (2000).

S.A. Lazarus, et al., "High Performance Liquid Chromatography/ Mass Spectrometry Analysis of Proanthocyanidins in Foods and Beverages", Methods in Enzymology 335:46-57 (2001).

M. Natsume, et al. "Analyses of Polyphenols in Cacao Liquor, Cocoa, and Chocolate by Normal-Phase and Reverse-Phase HPLC", Biosci. Biotech. Biochem. 64(12):2581-2587 (2000).

Adamson et al., J. Agric. Food. Chem. 47:4184-4188 (1999).
Cheynier et al., Methods in Enzymology 299 (1999).
Gu et al., J. Agric. Food Chem. 47:3693-3701 (2001).
Gu et al., J. Agric. Food Chem. 50:4852-4860 (2002).
Gu et al., J. Agric. Food Chem. 51:7513-7521 (2003).
Hammerstone et al., J. Agric. Food Chem. 47:490-496 (1999).
Labarbe et al., J. Agric. Food Chem. 47:2719 (1999).
Lazarus et al., J. Agric. Food Chem. 47:3693-3701 (1999).
Lazarus et al., J. Agric. Food Chem. 47:3693-3701 (2001).
Lazarus et al., American Chemical Society pp. A-I (1999).
Lea, J. Sci. Agric 30:833 (1979).
Natsume et al., Biosci. Bitechknol. Biochem. 64:2581 (2000).
Rigaud et al., J. Chromatog. A 654:179 (1993).
Shoji et al., J. Agric. Food Chem. 51:3806-3813 (2003).
Wilson, Sci. Food Agric. 32:257 (1981).
Yanagida et al., J. Chromatog. A 890:251 (2000).

* cited by examiner

Diol column separation of Cinnamomum loureirii acetone buffer extract

PROCESS FOR SEPARATING AND ISOLATING XANTHINES, INDIVIDUAL POLAR PROTIC MONOMERS, AND POLAR PROTIC OLIGOMERS

CROSS-REFERENCE TO RELATED APPLICATIONS

None.

BACKGROUND OF THE INVENTION

1. Field of the Invention

The present invention is directed to an improved process for separating and preferably recovering individual polar protic monomers and/or oligomers, including without limitation flavan-3-ols, according to their degree of polymerization, using diol-phase liquid chromatography (LC).

It is known that individual flavan-3-ols exhibit distinct properties and have distinct applications for human and animal use. Improved separation and recovery of individual flavan-3-ols on the basis of degree of polymerization will allow for more targeted and efficacious use thereof.

2. Discussion of the Related Art

Proanthocyanidins, the oligomers and polymers of flavan-3-ols, are the second most abundant natural plant phenolics after lignin. The flavan-3-ol subunits are linked primarily through a carbon-carbon bond from the 4 position of one subunit to the 8 position of another subunit (C4→C8), and to a lesser extent through C4→C6 linkage.

Proanthocyanidins include B-type and A-type proanthocyanidins. In the B-type proanthocyanidins, the monomers are linked via C4→C6 and/or C4→C8 interflavan linkages. Oligomers with exclusively C4→C8 linkages are linear, while the presence of at least one C4→C6 linkage results in a branched oligomer. By contrast, A-type proanthocyanidins are doubly linked oligomers containing linkages at C2-O-C7 as well as at C4→C6 or C4→C8.

The molecular weight of proanthocyanidins typically is expressed as degree of polymerization (DP). Individual oligomers are commonly referred to as dimers, trimers, etc.

Procyanidins represent the largest class of proanthocyanidins. Gu et al. showed that out of 41 foods found to contain proanthocyanidins, 27 contained procyanidins. See J. Agric. and Food Chem. 51 (2003) 7513. Procyanidins may include (−)-epicatechin, (+)-epicatechin, (+)-catechin and/or (−)-catechin monomeric units, as well as gallated catechins such as (−)-catechin gallate, (+)-catechin gallate, (−) epicatechin gallate and/or (+)-epicatechin gallate.

It is known that proanthocyanidins play important roles in the color stability, astringency, and bitterness of plant foods. See, e.g., Haslam, "Practical Polyphenols: From Molecular Recognition and Physiological Action" (Cambridge U. Press, 1998. However, the notoriety of proanthocyanidins has increased due to the potential health benefits of these phenolic compounds. See, e.g., Bagchi et al., Toxicology 148 (2000) 187; Foo et al., J. Natural Products 63 (2000) 1225; and Steinberg et al., Am. J. Clin. Nutri. 77 (2003) 1466).

It is also known that individual procyanidin oligomers present specific characteristics and potential benefits for use in humans and animals. For example, U.S. Pat. No. 5,211,944 (Tempesta) discloses that procyanidin oligomers having a degree of polymerization (DP) of 2-11 possess significant antiviral activity and are useful in treating warm-blooded animals, including humans infected with paramyxovaridae such as respiratory syncytial virus, orthomyxovaridae such as influenza A, B and C, and herpes viruses such as Herpes Simplex virus. U.S. Pat. No. 5,554,645 (Romanczyk, Jr. et al.) discloses antineoplastic compositions comprising procyanidin oligomers having a 3-11 together with a suitable carrier. U.S. Pat. No. 5,891,905 (Romanezyk, Jr., et al.) discloses that procyanidin oligomers having a 5-12 are useful as antioxidants. U.S. Pat. No. 6,524,630 (Schmitz et al.) discloses the use of cocoa procyanidin oligomers having a 2-18 together with acetylsalilcylic acid as an anti-platelet therapy.

Given their structural complexity and diversity in nature, the history of proanthocyanidin analysis is rich. See Santos-Buelga et al., "Processes in Polyphenol Analysis," Royal Society of Chemistry, Cambridge, 2003, p. 267). Lea described the use of normal-phase high performance liquid chromatography (NP-HPLC) for procyanidin analysis in J. Sci. Food and Agriculture (1979) 30:833 and also observed that using a Sephadex LH-20 column under isocratic conditions resulted in an elution order where the larger oligomers were retained longer than the smaller oligomers. See Lea et al., Am. J. Enology and Viticulture (1979) 30:289. Wilson et al. disclosed using a gradient mobile phase in connection with tetrahydrofuran-hexane-acetic/formic acid-isopropanol over a cyano column to achieve partial separation based on the degree of polymerization (DP) of apple juice procyanidins. See Sci. Food. Agric. (1981) 32:257.

Significant improvements in the separation and resolution of procyanidin oligomers have been achieved on silica stationary phases. See Rigaud et al., Chromatogr. (1993) 654: 179; Cheynier et al., Processes in Enzymology (1999) 299; Natsume el al., Biosci. Biotechnol. Biochem. (2000) 64:2581. Resolution of procyanidin oligomers up to the pentamer (DP=5) has been obtained. Hammerstone et al. disclosed modifications of this process leading to improvements in resolution of monomers through decamers in the analysis of unfermented, defatted cacao beans. See J. Agric. and Food Chem. (1999) 47:490. Gu et al. disclosed still further improvements leading to the elution of a decamer (DP=10), as well as enhancement in overall peak shape and resolution. See J. Agric. and Food Chem. (2000) 50:4852.

These HPLC processes use gradient mobile phases consisting of methylene chloride-methanol-acetic/formic acid-water to achieve separation of procyanidin oligomers out to the pentamer with an alternate process for separation of apple procyanidins using hexane-methanol-ethyl acetate and/or hexane-acetone over a silica column. See Yanagida et al., J. Chromatogr. A (2000) 890:251.

However, current HPLC processes, including those of Gu et al., have several shortcomings. First, the use of chlorinated solvents such as methylene chloride (also referred to as dichloromethane) presents safety concerns. This is especially an issue when isolated fractions from the larger scale systems may be targeted for further biological study. It is known that exposure to methylene chloride affects the skin, eyes, central nervous system (CNS), and cardiovascular system, and that short-term exposure can cause fatigue, weakness, sleepiness, light-headedness, numbness of limbs, tingling skin, nausea, and irritated skin and eyes. Chronic exposure to methylene chloride has been linked to cancer of the lungs, liver, and pancreas in laboratory animals. Methylene chloride also is a mutagen that may cause birth defects if women are exposed to it during pregnancy.

Tetrahydrofuran (THF), another common HPLC solvent, is known to irritate the eyes of human subjects, as well as the mucous membranes and the gastrointestinal tract. Overexposure to THF may cause coughing, shortness of breath, dizziness, central nervous system (CNS) depression, intoxication, and collapse.

Other problems with current HPLC processes for separating procyanidin oligomers include the historical problem associated with normal phase (NP) separation of procyanidins when using silica as the stationary phase, viz., column to column variability. Frequently, oligomers have reduced peak intensities or are not detected at all, as they are thought to be adsorbed on the silica surface. The use of water in the mobile phase—as required for peak shape in the NP separation of procyanidins—further degrades column to column reproducibility. Also, from a practical standpoint, most current HPLC processes for separating individual flavan-3-ols, including procyanidin oligomers, involve the use of tertiary or quaternary mobile phases, and thus are beyond the capabilities of analytical laboratories lacking sophisticated quaternary HPLC pumps.

What is needed is an improved process for identifying the individual polar protic oligomers on the basis of DP, as well as a process for separating and recovering individual polar protic oligomers based on DP that avoids use of dangerous and environmentally hazardous solvents, that provides improved separation and recovery of individual polar protic oligomers, that is suitable for use in analytical laboratories equipped only with a customary binary HPLC pump, and that is suitable for the recovery of specific oligomers on a preparative scale.

BRIEF SUMMARY OF THE INVENTION

The present invention provides an improved process for separating and eluting individual polar protic monomer(s) and/or oligomer(s). The process comprises the steps of: (i) introducing a liquid sample containing the monomer(s) and/or oligomer(s) into a liquid chromatography (LC) column packed with a polar bonded stationary phase; (ii) separating the individual monomer(s) and/or oligomer(s), on the basis of degree of polymerization, by passing a binary mobile phase comprising an A phase consisting essentially of a polar aprotic solvent and a B phase consisting essentially of a polar protic solvent through the column; and (iii) eluting one or more individual fractions containing the monomer(s) and/or oligomer(s). In certain preferred embodiments, one or more of the eluted individual monomer(s) and/or oligomer(s) may be recovered for use in a food product, a medicinal food product, a nutraceutical, or a pharmaceutical product, by drying or other conventional means. The eluted individual monomer(s) and/or oligomer(s) also may be recovered for use as standards in other separations.

The polar protic monomer(s) and/or oligomer(s) may be proanthocyanidins, hydrolyzable tannins, oligosaccharides, oligonucleotides, peptides, acrylamides, polysorbates, polyketides, poloxamers, polyethylene glycols, polyoxyethylene alcohols or polyvinyl alcohols. Where the polar protic monomer(s) and/or oligomer(s) are proanthocyanidins, they may be proapigeninidins, proluteolinidins, protricetinidins, propelargonidins, procyanidins, prodelphinidins, proguibourtinidins, profisetinidins, prorobinetinidins, proteracacinidins and/or promelacacinidins. Preferably, the monomer(s) are epicatechin and/or catechin, and the oligomer(s) are procyanidin oligomers thereof. Also preferably, the sample containing the monomer(s) and/or oligomer(s) is a polar, defatted cocoa extract.

The amount of extract present in the liquid sample introduced into the LC column preferably is greater than 10 milligrams. More preferably, the amount of extract is greater than 100 milligrams. Even more preferably, the amount of extract is greater than 1 gram.

The polar bonded stationary phase may be a diol phase, a glycerol phase, an amino phase, a cyano phase, a trimethylsilyl phase, a dimethylsilyl phase, a propyl phase, a butyl phase, a pentyl phase, a hexyl phase, a phenyl phase, a halogenated phase, or a nitro phase. Preferably, the stationary phase is a diol phase or a glycerol phase.

In the binary mobile phase, which preferably is aqueous, the polar aprotic solvent may be any of acetonitrile, acetone, cyclohexanone, methyl ethyl ketone, methyl tert-butyl ether, diethyl ether, dimethyl ether, methyl acetate, ethyl acetate and nitromethane, and the polar protic solvent may be any of methanol, ethanol, n-propanol, isopropanol, n-butanol and isobutanol.

The proportion of polar aprotic solvent in the A phase may be up to 100 percent by volume, and the proportion of the polar protic solvent in the B phase may be up to 100 percent by volume. The remainder of the A phase and B phase may be any mineral or organic acid and/or water. Preferably, the proportion of polar aprotic solvent in the A phase and polar protic solvent in the B phase is greater than 50 percent by volume. Even more preferably, the proportion of polar aprotic solvent (A phase) and polar protic solvent (B phase) is greater than 90 percent by volume. In a preferred embodiment, the polar aprotic solvent in the A phase is about 98% acetonitrile by volume, and the polar protic solvent in the B phase is about 95% methanol by volume.

The polar bonded stationary phase preferably has a particle size from about 3 μm to about 10 μm. The LC column preferably has a diameter of at least ten (10) millimeters.

The present invention also provides a system for separating and eluting individual polar protic monomer(s) and/or oligomer(s) on the basis of degree of polymerization. The system comprises an LC column packed with a polar bonded stationary chromatographic phase; and a binary mobile phase comprising an A phase consisting essentially of a polar aprotic solvent and a B phase consisting essentially of a polar protic solvent for eluting one or more individual fractions containing the monomer(s) and/or oligomer(s).

The polar bonded stationary phase may be any of a diol phase, a glycerol phase, an amino phase, a cyano phase, a trimethylsilyl phase, a dimethylsilyl phase, a propyl phase, a butyl phase, a pentyl phase, a hexyl phase, a phenyl phase, a halogenated phase and a nitro phase. Preferably, the polar bonded stationary chromatographic phase is a diol phase or a glycerol phase. Also preferably, the polar bonded stationary chromatographic phase has a particle size from about 3 μm to about 10 μm. The column preferably has a diameter of at least ten (10) millimeters.

In the binary phase, the polar aprotic solvent in the A phase may be any of acetonitrile, acetone, cyclohexanone, methyl ethyl ketone, methyl tert-butyl ether, diethyl ether, dimethyl ether, methyl acetate, ethyl acetate and nitromethane. The polar protic solvent in the B phase may be any of methanol, ethanol, n-propanol, isopropanol, n-butanol and isobutanol.

Suitable polar protic monomer(s) and/or oligomer(s) for the system include proanthocyanidins, hydrolyzable tannins, oligosaccharides, oligonucleotides, peptides, acrylamides, polysorbates, polyketides, poloxamers, polyethylene glycols, polyoxyethylene alcohols and polyvinyl alcohols. Where the polar protic monomer(s) and/or oligomer(s) are proanthocyanidins, they may be proapigeninidins, proluteolinidins, protricetinidins, propelargonidins, prodelphinidins, proguibourtinidins, profisetinidins, prorobinetindins, proteracacinidins and/or promelacacinidins. In a preferred embodiment, the monomer(s) are epicatechin and/or catechin, and the oligomer(s) are procyanidin oligomers thereof.

The proportion of polar aprotic solvent in the A phase may be up to 100% by volume, and the proportion of the polar protic solvent in the B phase may be up to 100% by volume.

The remainder of the A phase and B phase may be any mineral or organic acid and/or water. Preferably, the proportion of polar aprotic solvent in the A phase and polar protic solvent in the B phase is greater than 50% by volume. Even more preferably, the proportion of polar aprotic solvent (A phase) and polar protic solvent (B phase) is greater than 90% by volume. In a preferred embodiment, the polar aprotic solvent in the A phase is about 98% acetonitrile by volume, and the polar protic solvent in the B phase is about 95% methanol by volume.

The present invention also provides a process for separating and isolating xanthine(s) from polar protic monomer(s) and/or oligomer(s). The process comprises the steps of: (i) introducing a liquid sample containing the xanthine(s) and polar protic monomer(s) and/or oligomer(s) into a liquid chromatography (LC) column packed with a polar bonded stationary chromatographic phase; (ii) separating the xanthine(s) from the monomer(s) and/or oligomer(s) by passing an isocratic mobile phase consisting essentially of a polar aprotic solvent through the column; and (iii) eluting one or more individual fractions containing the xanthine(s). The xanthine(s) preferably are caffeine and/or theobromine. In a preferred embodiment, the liquid sample is a polar, defatted cocoa extract. In certain preferred embodiments, the eluted individual xanthine(s) may be recovered for use in a food product, a medicinal food product, a nutraceutical, or a pharmaceutical product, by drying or other conventional means. The eluted individual xanthine(s) also may be recovered for use as standards in other separations.

The polar bonded stationary phase may be a diol phase, a glycerol phase, an amino phase, a cyano phase, a trimethylsilyl phase, a dimethylsilyl phase, a propyl phase, a butyl phase, a pentyl phase, a hexyl phase, a phenyl phase, a halogenated phase, or a nitro phase. Preferably, the stationary phase is a diol phase or a glycerol phase.

The present invention also provides a system for separating and isolating xanthine(s) from polar protic monomer(s) and/or oligomer(s). The system comprises a liquid chromatography column packed with a polar bonded stationary chromatographic phase and an isocratic binary mobile phase consisting essentially of a polar aprotic solvent and a mineral or organic acid and/or water for eluting, separating, and isolating one or more individual fractions containing the xanthine(s) or the xanthine(s), and the monomer(s).

The polar bonded stationary phase may be any of a diol phase, a glycerol phase, an amino phase, a cyano phase, a trimethylsilyl phase, a dimethylsilyl phase, a propyl phase, a butyl phase, a pentyl phase, a hexyl phase, a phenyl phase, a halogenated phase and a nitro phase. Preferably, the stationary phase is a diol phase or a glycerol phase. Also preferably, the stationary phase has a particle size from about 3 µm to about 10 µm. The column preferably has a diameter of at least ten (10) millimeters.

In the isocratic mobile phase, the polar aprotic solvent preferably is acetonitrile. The proportion of polar aprotic solvent in the isocratic mobile phase preferably is greater than 90% by volume. The remainder may be any mineral or organic acid and/or water. In a preferred embodiment, the polar aprotic solvent in the isocratic mobile phase is about 99% by volume acetonitrile.

The present invention also provides a process for separating and eluting xanthine(s) and individual polar protic monomer(s) and/or oligomer(s). The process comprises the steps of: (i) introducing a liquid sample containing the xanthine(s) and polar protic monomer(s) and/or oligomer(s) into a liquid chromatography column packed with a polar bonded stationary chromatographic phase; (ii) separating the xanthine(s) from the monomer(s) and/or oligomer(s) by passing an isocratic mobile phase consisting essentially of a polar aprotic solvent through the column, and eluting one or more individual fractions containing the xanthine(s); (iii) subsequently separating the individual monomer(s) and/or oligomer(s), on the basis of degree of polymerization, by passing a binary mobile phase comprising an A phase consisting essentially of a polar aprotic solvent and a B phase consisting essentially of a polar protic solvent through the column; and (iv) eluting one or more individual fractions containing the monomer(s) and/or oligomer(s). In certain preferred embodiments, the eluted xanthine(s) and/or one or more of the eluted individual monomer(s) and/or oligomer(s) may be recovered for use in a food product, a medicinal food product, a nutraceutical, or a pharmaceutical product, by drying or other conventional means. The eluted xanthine(s) and/or eluted individual monomer(s) and/or oligomer(s) also may be recovered for use as standards in other separations.

The xanthine(s) preferably are caffeine and/or theobromine. The monomer(s) and/or oligomer(s) may be any of proanthocyanidins, hydrolyzable tannins, oligosaccharides, oligonucleotides, peptides, acrylamides, polysorbates, polyketides, poloxamers, polyethylene glycols, polyoxyethylene alcohols, and polyvinyl alcohols. The polar bonded stationary phase may be a diol phase, a glycerol phase, an amino phase, a cyano phase, a trimethylsilyl phase, a dimethylsilyl phase, a propyl phase, a butyl phase, a pentyl phase, a hexyl phase, a phenyl phase, a halogenated phase, or a nitro phase.

These and other objects and embodiments are disclosed or will be obvious from the following Detailed Description.

DETAILED DESCRIPTION OF THE INVENTION

The present invention discloses an improved process for separating and isolating polar protic monomer(s) and/or oligomer(s) on the basis of degree of polymerization, using a diol-based LC system having a binary mobile phase to elute one or more individual fractions containing individual polar protic monomer(s) and/or oligomer(s), as well as a system for same.

Figure 1:
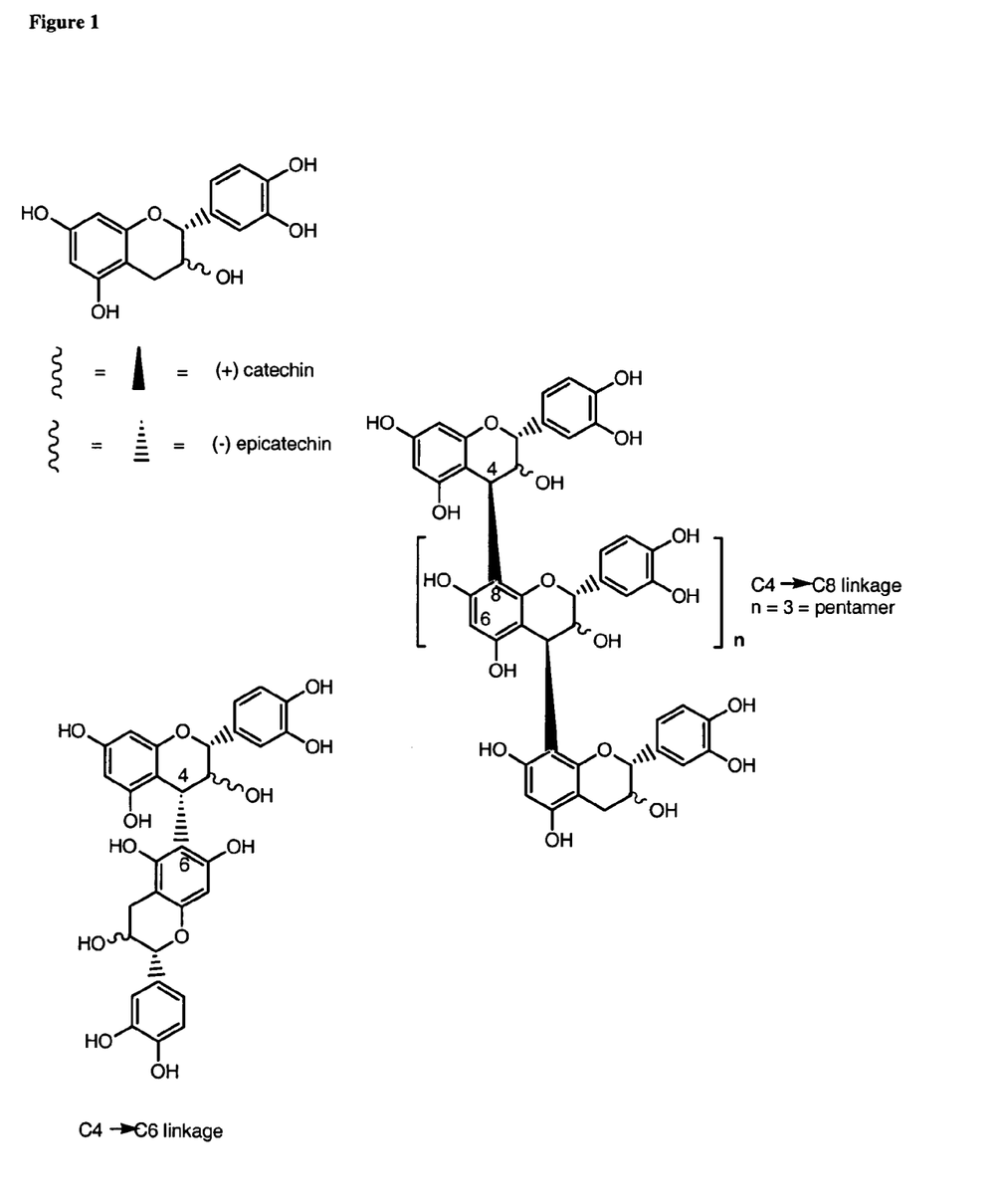
FIG. 1. Structure of monomeric flavan-3-ols and procyanidin oligomers linked through carbon-carbon C4→C8 and C4→C6 linkage.

FIG. 1 shows the structure of monomeric flavan-3-ols and procyanidin oligomers linked through C4→C8 and C4→C6 linkage.

Figure 4:
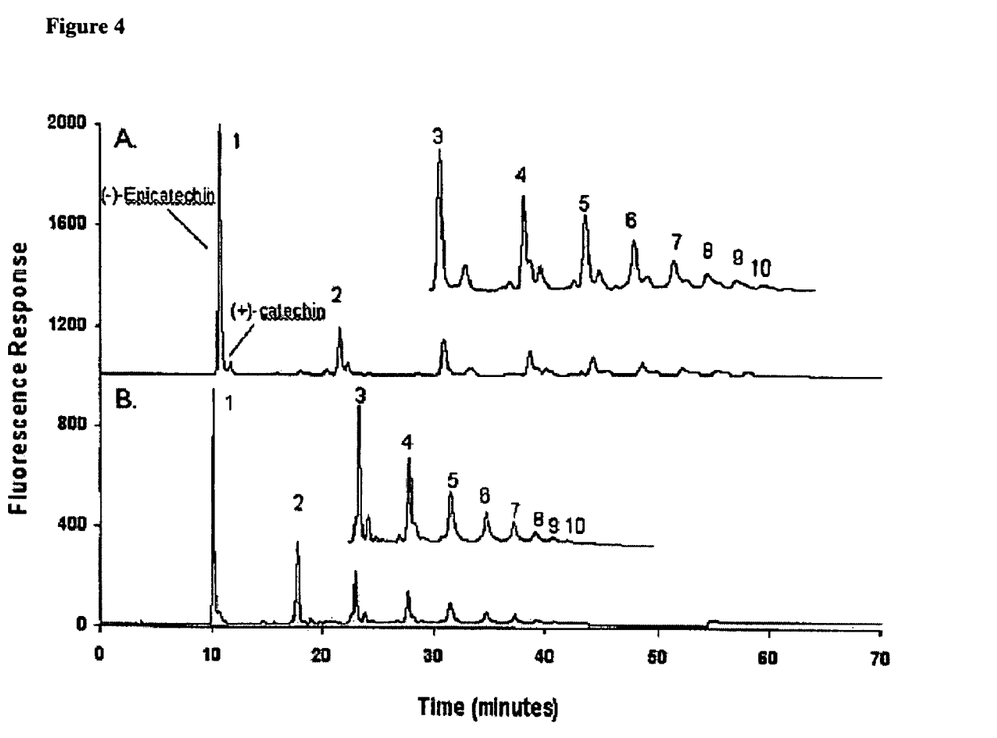
FIG. 4. HPLC chromatograms of procyanidins, using Lichrosphere Silica (bottom) and Develosil Diol (top) as stationary phase.

The improved processes and system of the present invention, using a diol-based stationary phase LC column and binary mobile phase comprising an A phase of acetonitrile and acetic acid ($CH_3CN$:HOAc) in a 98:2 (v/v) mix, and a B phase of methanol, water and acetic acid ($CH_3OH$:$H_2O$: HOAc) In 95:3:2 (v/v/v) mix, overcome the problem of providing for better separation of individual oligomers, including especially higher order oligomers. FIG. 4 shows a comparison of chromatograms using diol (top) and silica (bottom) as the stationary phase. As shown, the diol stationary phase provided for greater separation of individual oligomers and in particular provided for greater separation of oligomers having 7 or higher. It will be appreciated that the improved processes of the present invention also are more useful than current processes in that they can be used with a wider range of solvents (including water) and can be used in laboratories equipped only with a binary LC pump. Other benefits inherent in the improved processes include the ability to analyze compounds (i.e., other flavenoids, caffeine, theobromine) in addition to procyanidins in a single LC run, especially in conjunction with mass spectrometry (LC-MS). A process for separating caffeine and theobromine employing a modification of the improved process disclosed and claimed, is set forth herein.

The processes and system are more fully described below. While the specifically disclosed processes and system involve cocoa procyanidins, it will be understood by those of ordinary skill in the art that the disclosed processes and system are suitable for separating any polar protic monomer(s) and/or oligomer(s) including without limitation other proanthocyanidins (e.g., proapigeninidins, proluteolinidins, protricetinidins, propelargonidins, prodelphinidins, proguibourtinidins, profisetinidins, prorobinetindins, proteracacinidins and promelacacinidins), hydrolyzable tannins, oligosaccharides, oligonucleotides, peptides, acrylamides, polysorbates, polyketides, poloxamers, polyethylene glycols, polyoxyethylene alcohols, and polyvinyl alcohols. In addition to cocoa procyanidins, other substances which contain polar protic monomer(s) and/or oligomer(s) include peanut skins, cinnamon, blueberries, apples, sorghum, hawthorne, cranberries, and grapes. In addition, the disclosed processes and system are suitable for separating sugar polymers such as maltosaccharides, cyclodextrins, N-acetylchitooligosaccharides, and pridylamino sugar chains.

All solvents (methylene chloride, acetonitrile, methanol, acetic acid) were chromatographic grade and purchased from Fisher Scientific (Fairlawn, N.J.). Ethanol was USP-food grade purchased from Sigma-Aldrich (Milwaukee, Wis.). Water was deionized using a Milli-Q-Water Purification System from Millipore (Bedford, Mass.).

Sample preparation: CP extract. A cocoa polyphenol (CP) extract was prepared via a multi-step process aimed at minimizing degradation of the cocoa procyanidins. Cocoa beans were harvested, washed free of pulp and dried. Under ambient conditions the dried beans were expeller-pressed to remove cocoa butter. The expeller cake was then ground and extracted with ethanol:water (70:30 v/v). Solids were removed by centrifugation. The extract liquid was evaporated under reduced pressure to remove the ethanol and finally spray dried.

Sample preparation: CP extract from cacao seeds. Fresh unfermented cacao seeds (30 g) were freeze-dried (16.9 g). Freeze-dried seeds (10.2 g) were defatted with hexane, and a sub-sample of the defatted beans (6.3 g) was milled and extracted thrice with 40 mL acetone:water:acetic acid (70: 29.5:0.5, v/v/v) while sonicating (10 min, 50° C.). Acetone was removed from the combined extractions by rotary evaporation under reduced pressure. The remaining liquid was freeze dried to afford a red-purple residue (1.13 g).

Normal-phase high performance liquid chromatography mass spectrometry (NP-HPLC-MS) analysis of CP extracts and purified oligomers. Separation and characterization of procyanidin oligomers in cocoa extracts and procyanidin oligomeric fractions obtained from the preparative system described below were performed by NP-HPLC-MS. Separations were conducted on an Agilent 1100 HPLC system equipped with an autosampler, quaternary HPLC pump, column heater, diode array detector, and fluorescence detector. The HPLC was interfaced to an HP Series 1100 mass selective detector (Model G1946A) equipped with an API-ES ionization chamber. The column used was Develosil Diol (250× 4.6 mm I.D., 5μ particle size) purchased from Phenomenex (Torrance, Calif.). The binary mobile phase consisted of (A) acetonitrile: acetic acid (98:2, v/v) and (B) methanol: water: acetic acid (95:3:2, v/v/v). Separations were effected by a linear gradient (of the mobile phase) at 30° C. with an 0.8 mL/min flow rate as follows: 0-35 minutes, 0-40% B; 35-40 min, 40% B isocratic; 40-45 min, 40-0% B, followed by a 5 minute reequilibration time. Eluent was monitored by fluorescence detection (FLD) (excitation wavelength=276 nm, emission wavelength=316 nm). Extracts and purified fractions were characterized by MS processes and parameters adapted from Hammerstone et al., J. Agric. and Food Chem. 47 (1999) 490, which are incorporated herein by reference. Ionization reagents were added via a tee in the eluant stream of the LC just prior to the mass spectrometer and delivered via an LC pump. Conditions for analysis in the positive ion mode included introduction of 0.05M NaCl at a flow rate of 0.05 mL/min to assist ionization, a capillary voltage of 3.5 kV, a fragmentor voltage of 100 V, a nebulizing pressure of 25 psig, and a drying gas temperature of 350° C. Conditions for analysis in the negative ion mode included 1.5 M NH4OH as a buffering agent at a flow rate of 0.09 mL/min for 29 minutes, and then at 0.05 mL/min. Capillary voltage was 3 kV, fragmentor voltage was 75 V. nebulizing pressure was 25 psig and drying gas temperature was 350° C.

Use of ammonium hydroxide $NH_4OH$) was omitted from the MS analysis. Samples were dissolved in acetone:water: acetic acid (70:29.5:0.5, v/v/v) or the mobile phase and filtered through 0.45 μm PTFE syringe filters prior to injection.

Comparative NP-HPLC of CP extracts conducted on both Lichrosphere silica and Develosil diol stationary phases. Separations of CP fractions were conducted on both Lichrosphere Silica and Develosil Diol stationary phases under the chromatographic conditions described by Adamson et al., J. Agric. and Food Chem. 47 (1999) 4184. The chromatographic system was an Agilent 1100 Series HPLC system equipped with a temperature-controlled autosampler, quaternary pump, column heater, and fluorescence detector. The columns used were Lichrosphere Silica (250×4.6 mm, 5μ, 100 Å pore size) and Develosil Diol. The chromatographic mobile phase consisted of methylene chloride ($CH_2Cl_2$), methanol ($CH_3OH$), and acetic acid:water (1:1) (HOAc: $H_2O$). Starting mobile phase conditions were 82% $CH_2Cl_2$, 14% $CH_3OH$ and 4% (HOAc:$H_2O$). Subsequently $CH_3OH$ was ramped to 28.4% after 30 minutes, 42.8% after 50 minutes, and 86.0% after 51 minutes. Throughout the chromatographic run, the HOAc:$H_2O$ ratio was held at a constant 4%. Fluorescence detection was conducted with an excitation wavelength of 276 nm and emission at 316 nm. All samples were prepared by dissolution in acetone:water:acetic acid (70:29.5:0.5) and then filtered through 0.45 μm PTFE syringe filters for subsequent HPLC injection.

Preparative NP-HPLC of CP extracts. An Agilent 1100 series preparative pump was connected to a HP 1050 UV detector and a Kipp and Zonen recorder. Preparative separation of procyanidins was achieved using a Develosil Diol (300×50 mm I. D., 100 μm particle size) column purchased from Phenomenex (Torrance, Calif.). The mobile phase consisted of solvents A ($CH_3CN$:HOAc, 99:1 v/v) and B ($CH_3OH$:$H_2O$:HOAc, 95:4:1 v/v/v) using a linear gradient of 0-30% B for 35 min. followed by isocratic period for 30 min, finally increasing to 80% B. The re-equilibration time was 10 min. The flow rate was set to 55 ml/min, the column temperature was room temperature (23±2° C.). The detector was set to 280 nm. Column loading was performed with a manual sample injector Rheodyne Valve model 7725 equipped with a 2 mL injection loop. CP extract was dissolved in mobile phase, centrifuged and filtered through 0.45 μm PTFE syringe filter prior to injecting.

Semi-preparative separation of procyanidins was also achieved using a Develosil Diol (250×21.5 mm I. D., 100 μm particle size) column purchased from Phenomenex (Torrance, Calif.). The mobile phase consisted of the same composition as discussed above. The linear gradient was 0-30% B for 45 min followed by isocratic period for 20 min, finally increasing to 85% B to wash any remaining residues off the column. The flow rate for this column was 15 mL/min.

Figure 2:
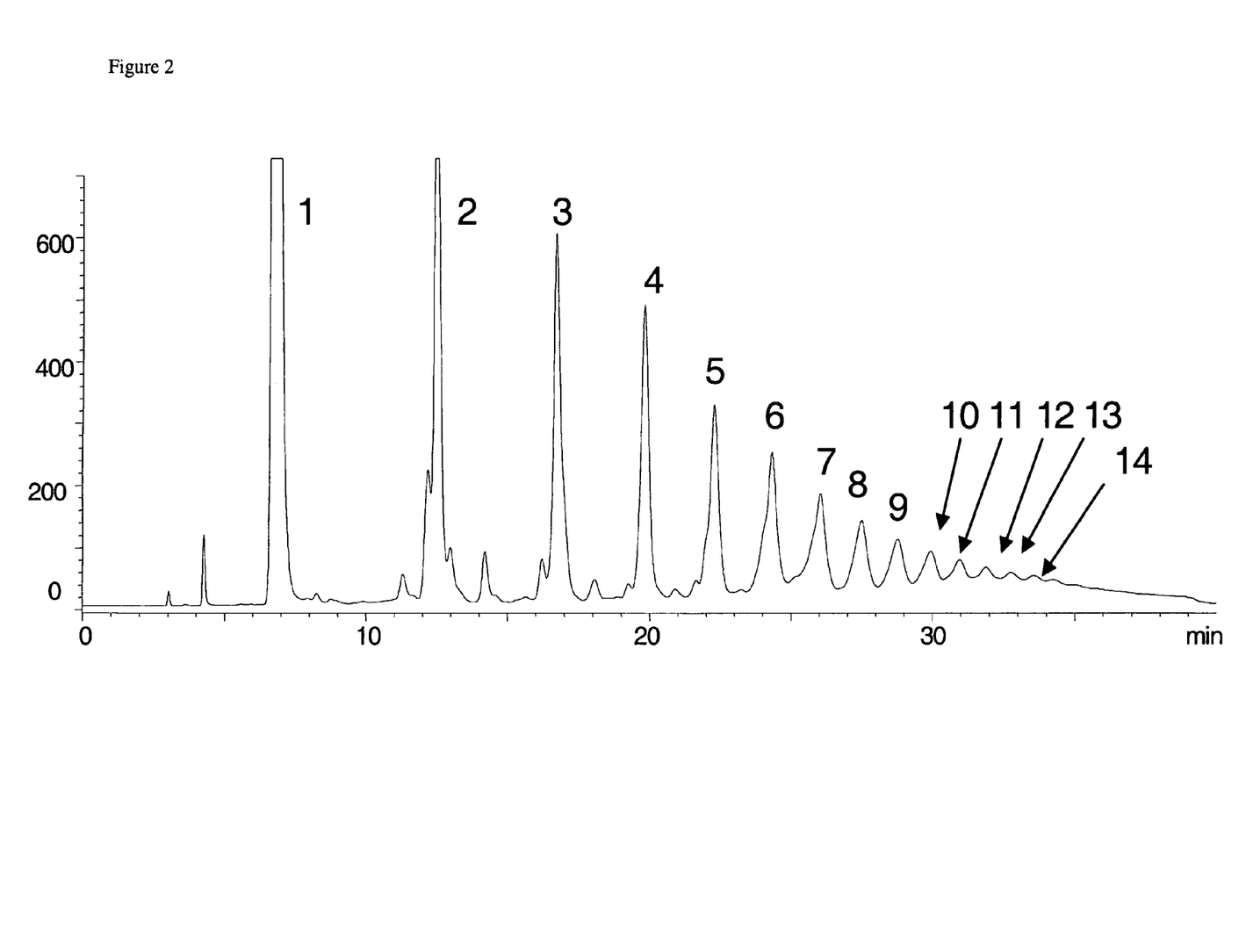
FIG. 2. Diol-phase HPLC fluorescence trace of procyanidins from unfermented cacao beans.
Figure 3:
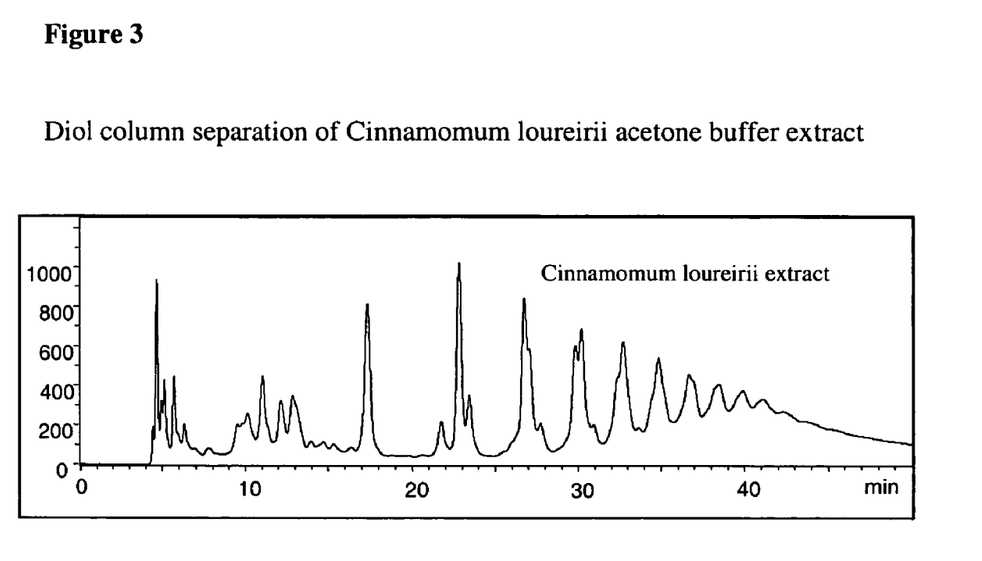
FIG. 3. Diol column HPLC trace of separation of polar protic monomers and oligomers from Cinnamomum loureirii acetone buffer extract.

FIG. 2 shows the chromatogram of an unfermented, defatted cacao seed extract. The labels 2-14 indicate the degree of polymerization of procyanidins in the peaks. Compounds were eluted according to their degree of polymerization and were characterized by LC-MS as flavan-3-ol monomers and oligomers up to the terradecamer (DP=14). As disclosed by Gu et al., the flavan-3-ol monomeric and oligomeric composition of unfermented cacao consists exclusively of (−)-epicatechin and (+)-catechin. See J. Agric. and Food Chem. 51 (2003) 7513). Gu et al. isolated a procyanidin polymer—after the decamer peak—consisting of procyanidins with an average 14. (Id.). FIG. 3 shows similar separation of monomers and oligomers, on the basis of DP, from a Cinnamomum loureirii acetone buffer extract using the improved diol stationary phase and binary mobile phase process.

Figure 5:
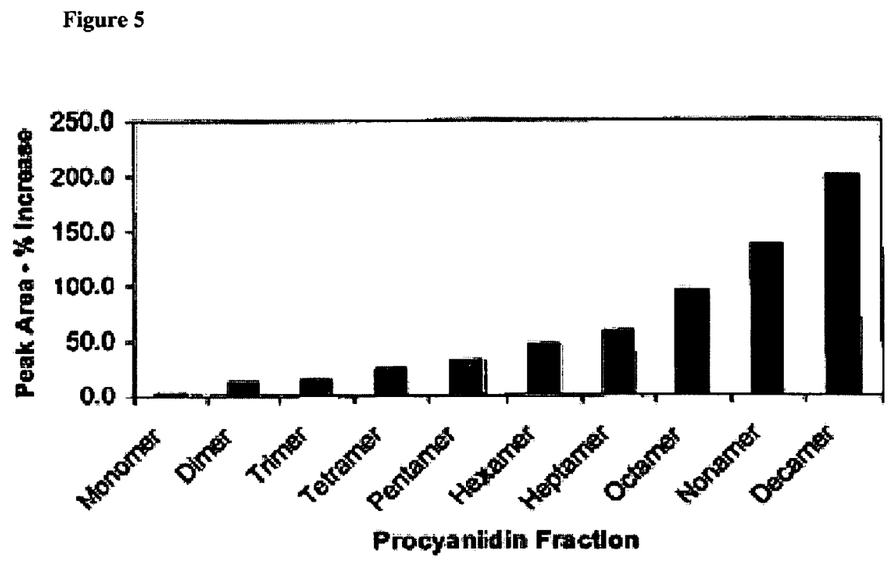
FIG. 5. Graph of percentage increase in peak area of diol-versus-silica stationary phase in HPLC for procyanidin oligomers, by degree of polymerization.

Comparison with current methodoloay. To assess the chromatographic performance of the Develosil Diol phase as compared to Lichrosphere Silica phase, each column was evaluated under the chromatographic conditions described by Adamson et al. See J. Agric. and Food Chem. 47 (1999) 4184). The new chromatographic conditions used for the diol phase (i.e, diol for the stationary phase, acetonitrile in place of methylene chloride in the binary mobile phase) did not effect separation of procyanidins when used for the silica phase. Typical chromatograms for the Lichrosphere Silica phase and the Develosil Diol phase are shown in FIG. 4. The chromatograms show the significant differences in retention characteristics under identical chromatographic conditions. The bonded diol phase showed similar retention characteristics only for the procyanidin monomers, i.e., (−)-epicatechin and (+)-catechin. The bonded diol phase showed stronger retention characteristics for the dimer through the decamer with retention increasing with degree of polymerization. The retention time for the decamer fraction was about 50% longer than that observed for the Lichrosphere silica phase under identical conditions. Consistent with the stronger retention characteristics of the diol phase, an increase in speciation was also observed. This was apparent throughout the entire chromatogram and even impacted the monomer region at 10 minutes. The diol phase yielded almost baseline resolution of (−)-epicatechin and (+)-catechin while the silica phase showed significant co-elution. This enhanced speciation was not a surprising consequence for the more retentive bonded phase. However, comparison of peak areas between diol and silica stationary phases yielded an unexpected result with the overall peak areas for DP=2 through DP=10 increased on the diol phase as compared to the silica phase. The magnitude of the increases became greater with increasing molecular weight. These observations, illustrated by the graph in FIG. 5, are most likely a result of a reduction in the adsorption phenomenon. The observations were especially striking considering that longer retention typically generates broader peak shapes with smaller areas.

Preparative scale. Increasing the scale of the chromatography is of interest not only for generating standards for further analytical advancements but also for elucidating the various physiological mechanisms that these phenolic molecules are purported to utilize by generating "clean" oligomeric fractions for subsequent biological investigations. Although the most current analytical processes for the separation of procyanidins according to DP work well and have been employed on a routine basis (see, e.g., Rigaud et al., Chromatogr. 654 (1993) 179; Hammerstone et al., J. Agric. and Food Chem. 47 (1999) 490; and Gu et al., J. Agric. and Food Chem. 50 (2002) 4852), the composition of the mobile phase ($CH_2Cl_2$, $CH_3OH$, HOAc) severely limits the scale up of this process.

One of the major benefits of the diol stationary phase process described herein is the ability to scale up the process with a smaller concern for safety issues and disposal costs. Due to solvent choice and the relative simplicity of the binary mobile phase gradient used for the analytical scale, the process was able to be transferred to a semi-preparative (250× 21.5 mm) and then to the preparative (300×50 mm) scale HPLC system with alterations in only the gradient and flowrate.

Figure 6:
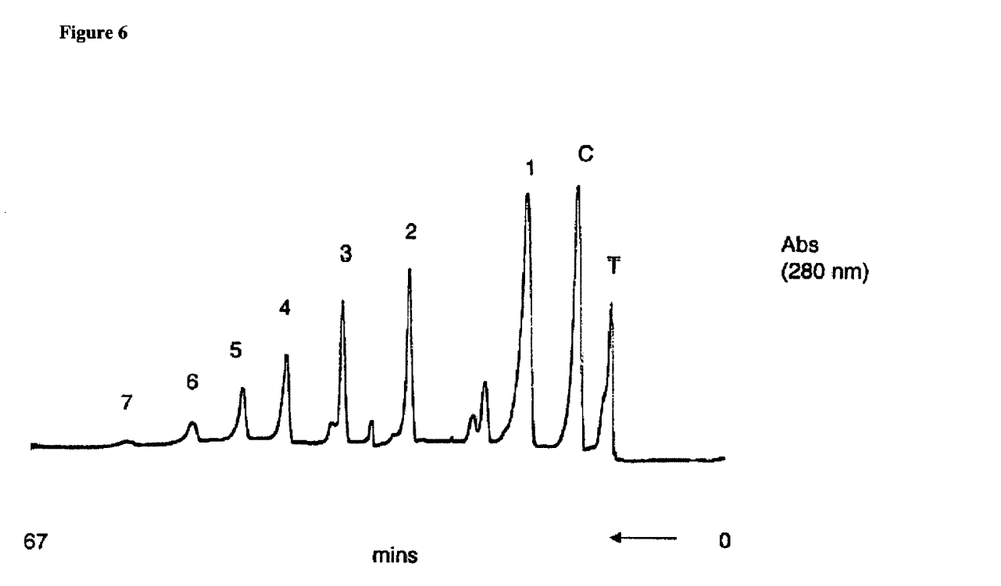
FIG. 6. Preparative-phase HPLC profile of CP extract.

A separation of the procyanidin oligomers was achieved with a preparative Diol-Develosil column (300×50 mm) using a mobile phase consisting of acetonitrile, methanol and acetic acid. The absorbance of the eluate was monitored at 280 nm. Nine peaks were observed in a 70-minute run. FIG. 6 shows the trace obtained from the recorder. There, T and C refer to the xanthines, theobromine and caffeine, respectively. The numbered peaks refer to DP. The solvents are low boiling and easy to remove, assisting in the isolation of the oligomers. In addition, the acid content is less.

This methodology is in sharp contrast with that of Adamson et al. (J. Agric. and Food Chem. 47 (1999) 4184) which describes where the fractionation of cocoa procyanidin oligomers occurs over a silica column using a gradient of methylene chloride-methanol-acetic acid-water. In a single run (180 minutes) using a 500×20 mm Supelcosil LC-Si column, Adamson et al. used nearly 4.5 liters of methylene chloride as part of the mobile phase. Additionally, multiple extraction runs were needed in order to isolate the oligomeric fractions used as reference materials.

Comparison to Sephadex. Although the theoretical upper limit of material that can be loaded on the preparative diol column is smaller than that which can be loaded onto a 600× 100 cm Sephadex LH-50 column (~4 g versus 25 g CP respectively), there are significant improvements with respect to solvent use, time (70 minute run for diol versus several days for Sephadex) and resolution. In addition, detection and monitoring during collection was possible with the preparative diol system allowing for 'cleaner' fractions as demonstrated in FIG. 7. Currently, it is the solubility of the CP extract in the mobile phase that limits size of the amount of material in one injection (2 mL injection loop volume). The sample preparation involves dissolution of the CP extract in mobile phase (A:B, 25:75 v/v). Under these conditions, a white precipitate (identified as a mixture of xanthines) and a resinous material formed. Increasing the ratio of solvent to solid did not alter these results. After centrifugation, the supernatant was isolated and injected onto the column. Addition of ethanol dissolved the resinous material. Analysis of this dissolved material, on the analytical scale process, gave fractions with DP up to 14. However, injection of the ethanol soluble material onto the column with the mobile phase that induced precipitation, was not desirable for large-scale preparative work. Various methodologies for sample preparation (pre-purification via extractions) to increase injection load per injection volume, thereby enhancing efficiency, are currently being investigated.

Figure 7:
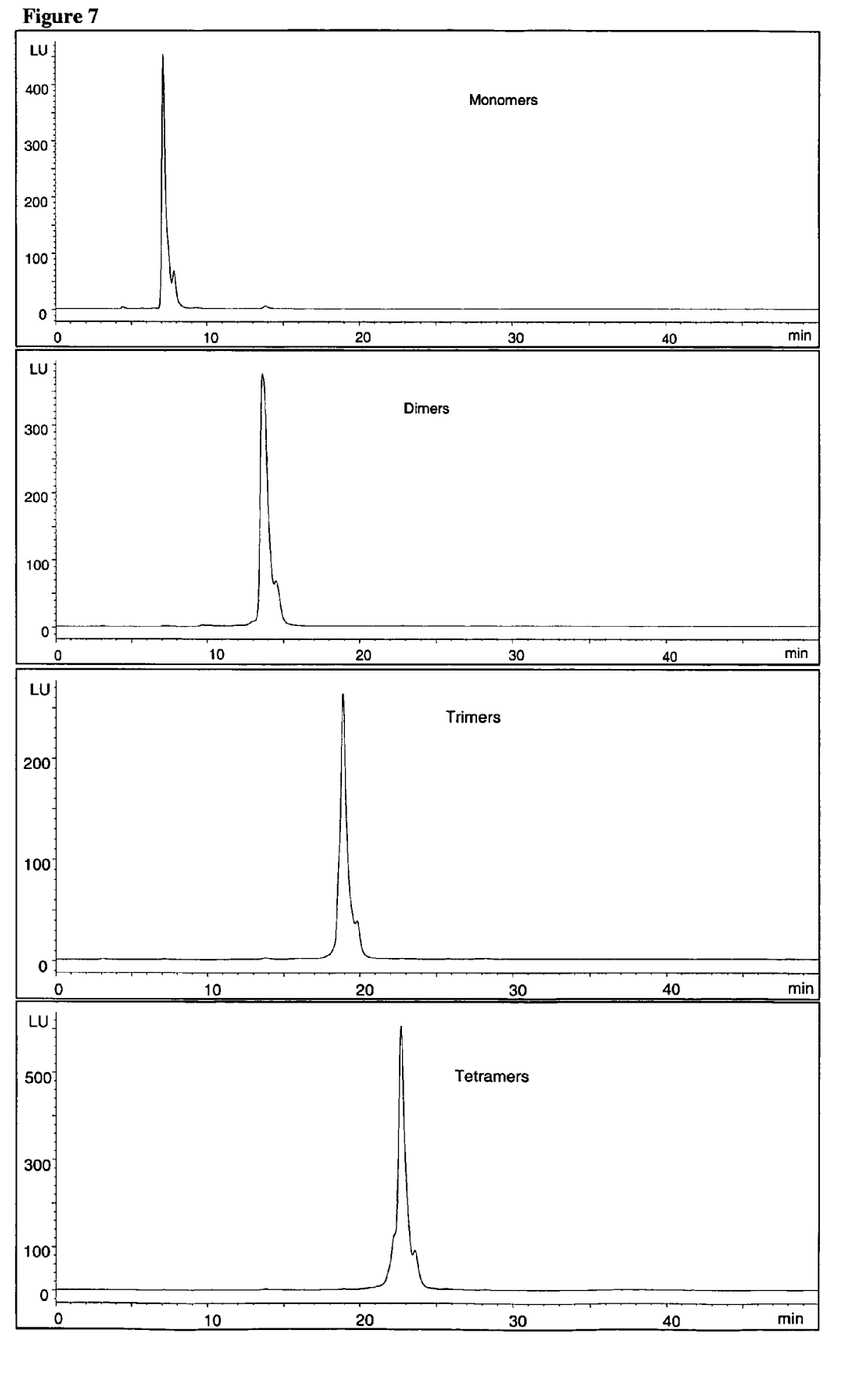
FIG. 7. FLD traces of individual fractions collected from HPLC separation of CP extract for oligomeric fractions DP=1 through 7.

Analysis of the isolated peaks (HPLC/FLD) assisted in assessing the purity of the fractions, all of which showed purities greater than 95%. FIG. 7 shows FLD traces of the individual fractions collected from a preparative HPLC separation of CP extract for oligomeric fractions DP=1 through DP=7. MS-electrospray ionization in the negative ion mode was employed for the molecular mass assignments of the individual oligomeric fractions. These data are consistent with the previous literature reports of Hammerstone et al., J. Agric. and Food Chem. 47 (1999) 490). The numbers in FIG. 6 (i.e., 1-7) correspond to the DP of the oligomeric fractions. The first two peaks, labeled T and C, were identified as the xanthines, i.e., theobromine (T) and caffeine (C), using LC-MS ESI in the positive ion mode.

Consistent with the stronger retention characteristics of the diol phase, an increase in speciation was also observed. This was apparent throughout the entire chromatogram and even impacted the monomer region at 10 minutes. The diol phase yielded almost baseline resolution of (−)-epicateehin and (+)-catechin while the silica phase showed significant co-elution.

Comparison of peak areas between diol and silica stationary phases yielded an unexpected result: the overall peak areas for DP=2 through DP=10 were increased on the diol phase as compared to the silica phase. The magnitude of increase became greater with increasing molecular weight (i.e., DP), as shown in FIG. 5. The observations were especially striking considering that longer retention times typically generate broader peak shapes with smaller areas.

It will be understood by one of ordinary skill in the art that, although the above examples use diol as a stationary phase, other polar bonded stationary chromatographic phases may be used to obtain the same results. Other suitable stationary phases include, but are not limited to, a glycerol phase, an amino phase (preferably, a propyl amine phase), a cyano phase (preferably, a cyanopropyl phase), a trimethylsilyl phase, a dimethylsilyl phase, a propyl phase, a butyl phase, a pentyl phase, a hexyl phase, a phenyl phase, a halogenated phase, or a nitro phase. Also, while the disclosed particle size is 5 μm, it will be understood by those of ordinary skill in the art that, particularly with respect to a diol stationary phase, any commercially available particle size may be used for the separation. Presently, commercially available did particle sizes include 3, 5 and 10 μm.

Similarly, although the above examples use a binary mobile phase of acetonitrile and methanol, the binary mobile phase may be a combination of any polar aprotic solvent (A phase) followed by any polar protic solvent (B phase). Suitable polar aprotic solvents for the (A) phase include, in addition to acetonitrile, acetone, cyclohexanone, methyl ethyl ketone, methyl tert-butyl ether, diethyl ether, dimethyl ether, methyl acetate, ethyl acetat, and nitromethane. Suitable polar protic solvents for the (B) phase include, in addition to methanol, ethanol, n-propanol, isopropanol, n-butanoh, and isobutanol. It will be understood that the proportion of polar aprotic solvent in the A phase and polar protic solvent in the B phase may be between 0 and 100% by volume, preferably greater than 50% by volume, and even more preferably greater than 90% by volume. The remainder of the A phase and B phase may be any mineral or organic acid (e.g. acetic acid) and/or water.

Accordingly, the improved processes and system of the present invention for separating polar protic oligomers based on degree of polymerization on an analytical scale and for separating and isolating the oligomers on a preparative scale provide several advantages over existing approaches. The polar bonded stationary chromatographic phase is more robust than a silica, phase and can tolerate a wider range of solvents. The long term adsorption properties of silica are compromised in the presence of water, whereas with the polar bonded stationary chromatographic phase, such as a diol or a glycerol stationary phase, this is not a concern. When directly compared to the silica phase, the diol phase was shown to reduce or eliminate surface adsorption, thereby providing for increased speciation of individual oligomers including especially oligomers with a DP of at least 10. A binary mobile phase is used rather than the typical tertiary or quaternary phases, thereby making the process readily adaptable for researchers lacking sophisticated quaternary HPLC pumps. The solvents used in the disclosed process are less dangerous and more environmentally friendly than those currently employed, viz., the carcinogen/mutagen methylene chloride and the CNS depressant tetrahydrofuran (THF). Finally, the process allows 'clean' physical isolation of fractions according to DP which can be advantageous with respect to generating standards for further research or for purification of individual oligomers.

In addition to separating polar protic oligomers on the basis of DP, a modification of the mobile phase gradient used to separate the procyanidin oligomers (according to DP) has been found to enable generation of a decaffeinated and detheobrominated cocoa polyphenol extract. With respect to recovery: starting with 1 g (40% CP—i.e., 400 mg of material), 134 mg of oligomers (DP>2) were recovered. The mass of the recovered monomer was 39 mg.

Separation of xanthines (caffeine and theobromine) from cocoa polyphenols was carried out on an Agilent 1100 HPLC system using a Develosil Diol 300×50 mm, 100 μm column (stationary phase) at room temperature (i.e., ~25° C.). The composition of the binary mobile phase was as follows: the (A) phase comprised acetonitrilc:acetic acid 99:1 (v/v) and the (B) phase comprised methanol:water:acetic acid 95:4:1 (v/v/v). The flow rate for semi-preparative work was set at 30 ml/min. Separations were effected by a linear gradient as follows: 0 minutes, 0% B; 15 minutes, 0% B; 20 minutes, 100% B; 30 minutes, 100% B. Analysis was by UV detection at 280 nm, and fluorescence.

Figure 8:
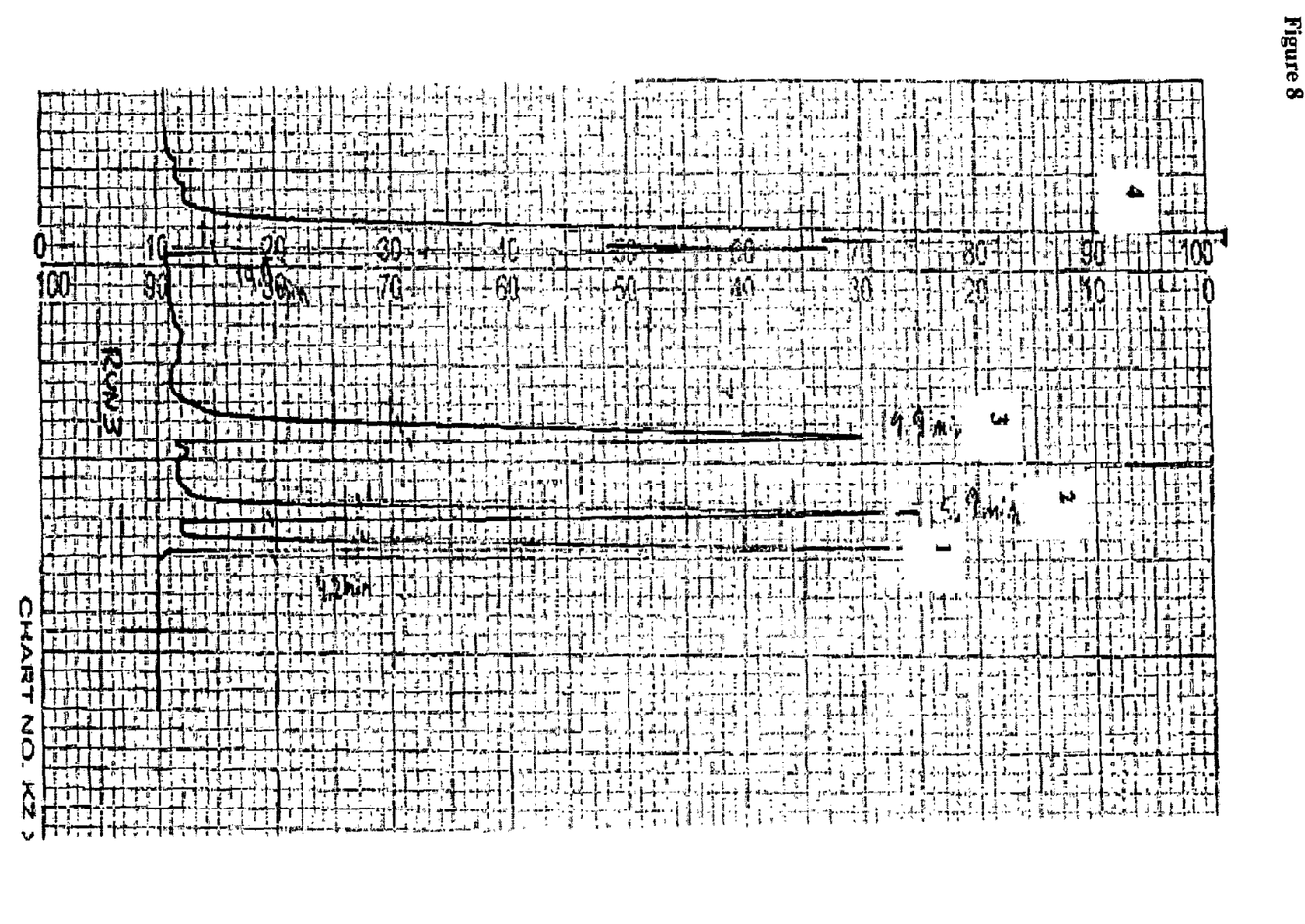
FIG. 8. LC trace chromatogram of preparative system for separating caffeine and theobromine from CP extract.

FIG. 8 shows an LC trace generated by the preparative HPLC system. Peak 1 is theobromine, peak 2 is caffeine, peak three is the monomer (flavanol) and peak 4 is oligomers with DP>1. Holding initial mobile phase conditions for 15 minutes (i.e., 0% B phase, 100% A phase), theobromine, caffeine and monomer were eluted first. Adjusting the mobile phase to high polarity allowed for quick recovery of CP oligomers (DP>1).

Figure 9:
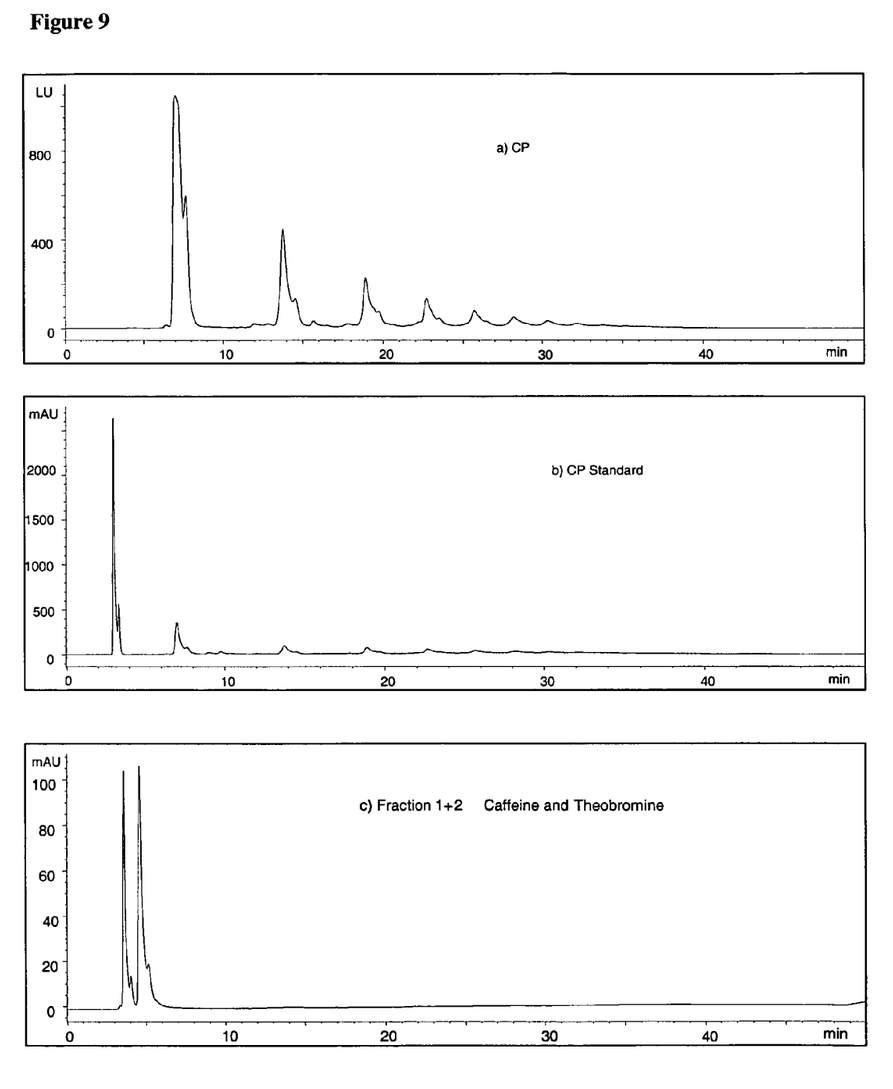
FIG. 9. HPLC analytical chromatograms of isolated fractions from semi-preparative diol separation.

FIG. 9 displays the analyses of the fractions. Trace (a) is the fluorescence detection of the CP extract. Trace (b) is the UV detection of the same material. It is known that xanthines do not fluoresce substantially and CPs do not display strong signals under UV detection. Using both detection modes thus gives a more comprehensive picture.

Trace (c) shows the UV trace of the xanthines removed from the CP extract. Although the analysis of individual fractions of theobromine and caffeine are not displayed, they can be separated and physically isolated. Additionally, the monomer can be separated and isolated from the xanthines. See trace (d).

Trace (e) shows the UV trace of the CP extract after removal of the monomer and xanthines. As is evident, the sample contains only oligomers of DP>2.

While the invention has been described with respect to certain specific embodiments, it will be appreciated that many modifications and changes may be made by those skilled in the art without departing from the invention. It is intended, therefore, by the appended claims to cover all such modifications and changes as may fall within the true spirit and scope of the invention.

What is claimed is:

1. A normal phase high performance liquid chromatographic process for separating, eluting, and isolating xanthine(s) and polar protic monomer(s) from polar protic oligomer(s) comprises the steps of:
    (a) introducing a liquid sample containing the xanthine(s), the polar protic monomer(s), and the polar protic oligomer(s) into a liquid chromatography column packed with a polar bonded stationary phase selected from the group consisting of a diol phase, a glycerol phase, an amino phase, a cyano phase, a trimethylsilyl phase, a dimethylsilyl phase, a halogenated phase, and a nitro phase;
    (b) passing an isocratic mobile phase consisting essentially of a polar aprotic solvent through the column to elute the xanthine(s) and the polar protic monomer(s);
    (c) isolating one or more individual fractions containing the xanthine(s) and the polar protic monomer(s); and
    (d) optionally recovering the isolated xanthine(s) and/or the isolated polar protic monomer(s).

2. A normal phase high performance liquid chromatographic process for separating, eluting, and isolating xanthine(s), individual polar protic monomer(s), and individual polar protic oligomer(s) comprises the steps of:
    (a) introducing a liquid sample containing the xanthine(s) the polar protic monomer(s), and the polar protic oligomer(s) into a liquid chromatography column packed with a polar bonded stationary phase selected from the group consisting of a diol phase, a glycerol phase, an amino phase, a cyano phase, a trimethylsilyl phase, a dimethyisilyl phase, a halogenated phase, and a nitro phase;
    (b) passing an isocratic mobile phase consisting essentially of a polar aprotic solvent through the column to elute the xanthine(s) and the polar protic monomer(s);
    (c) isolating one or more individual fractions containing the xanthine(s) and the polar protic monomer(s);
    (d) passing a binary mobile phase comprising an A phase consisting essentially of a polar aprotic solvent and a B phase consisting essentially of a polar protic solvent through the column to elute the individual polar protic oligomer(s) on the basis of degree of polymerization;
    (e) isolating one or more individual fractions containing the polar protic oligomer(s); and
    (f) optionally recovering the isolated xanthine(s), the isolated polar protic monomer(s), and/or the isolated polar protic oligomer(s).

3. The process of claim 1, or 2, wherein the polar protic oligomers are proanthocyanidin oligomers selected from the group consisting of proapigeninidins, proluteolinidins, protricetinidins, propelargonidins, procyanidins, prodelphinidins, proguibourtinidins, profisetinidins, prorobinetinidins, proteracacinidins, and promelacacinidins.

4. The process of claim 1, or 2, wherein the polar protic monomer(s) are epicatechin and/or catechin and the polar protic oligomer(s) are procyanidins.

5. The process of claim 1, or 2, wherein the liquid sample is a polar, defatted cocoa extract.

6. The process of claim 1, or 2, wherein the stationary phase is the diol phase or the glycerol phase.

7. The process of claim 1, or 2, wherein the stationary phase has a particle size from about 3 μm to about 10 μm.

8. The process of claim 1, or 2, wherein the polar aprotic solvent is acetonitrile, acetone, cyclohexanone, methyl ethyl ketone, methyl tert-butyl ether, diethyl ether, dimethyl ether, methyl acetate, ethyl acetate, or nitromethane.

9. The process of claim 2, wherein the A phase and the B phase are aqueous phases.

10. The process of claim 2, wherein the proportion of the polar aprotic solvent in the A phase is up to 100% by volume and the proportion of the polar aprotic solvent in the B phase is up to 100% by volume.

11. The process of claim 10, wherein the proportion of the polar aprotic solvent in the A phase is greater than 50% by volume; wherein the proportion of the polar protic solvent in the B phase is greater than 50% by volume; and wherein the remainder of the A phase and the B phase is an mineral acid, or organic acid, and/or water.

12. The process of claim 11, wherein the proportion of the polar aprotic solvent in the A phase is greater than 90% by volume; wherein the proportion of the polar aprotic solvent in the B phase is greater than 90% by volume; and wherein the organic acid is acetic acid.

13. The process of claim 12, wherein the A phase consists essentially of a mixture of about 98% acetonitrile and about 2% acetic acid (v/v) or a mixture of about 99% aectonitrile and 1% acetic acid (v/v) and wherein the B phase consists essentially of a mixture of about 95% methanol, about 3% water, and about 2% acetic acid (v/v/v) or a mixture of about 95% methanol, about 4% water, and about 1% acetic acid (v/v/v).

14. The process of claim 1 or 2, wherein the xanthine(s) are caffeine and/or theobromine.

15. The process of claim 1 or 2, wherein the isocratic mobile phase is an aqueous phase.

16. The process of claim 1 or 2, where wherein the proportion of the polar aprotic solvent in the isocratic mobile phase is at least 90% by volume.

17. The process of claim 16, wherein the polar aprotic solvent in the isocratic mobile phase is acetonitrile.

18. The process of claim 17, wherein the isocratic mobile phase consists essentially of about 99% acetonitrile by volume.

19. The process of claim 2, wherein the polar protic solvent is methanol, ethanol, n-propanol, isopropanol, n-butanol, or isobutanol.

* * * * *